United States Patent
Chen et al.

(10) Patent No.: US 7,415,405 B2
(45) Date of Patent: Aug. 19, 2008

(54) DATABASE SCRIPT TRANSLATION TOOL

(75) Inventors: Yen-Fu Chen, Austin, TX (US); John Hans Handy Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 10/666,815

(22) Filed: Sep. 18, 2003

(65) Prior Publication Data
US 2005/0065771 A1  Mar. 24, 2005

(51) Int. Cl.
*G06F 17/20* (2006.01)
*G06F 17/27* (2006.01)

(52) U.S. Cl. .............................................. 704/8; 704/9
(58) Field of Classification Search .................. None
See application file for complete search history.

(56) References Cited

U.S. PATENT DOCUMENTS

| | | | |
|---|---|---|---|
| 5,195,034 A | 3/1993 | Garneau et al. | 364/419 |
| 5,778,356 A * | 7/1998 | Heiny | 707/2 |
| 5,852,715 A * | 12/1998 | Raz et al. | 709/201 |
| 6,055,365 A | 4/2000 | Tye | 395/500.02 |
| 6,400,287 B1 | 6/2002 | Ehrman | 341/55 |
| 6,496,793 B1 | 12/2002 | Veditz et al. | 704/8 |
| 6,546,365 B1 | 4/2003 | Gajda et al. | 704/8 |
| 7,177,793 B2 * | 2/2007 | Barker et al. | 704/8 |

FOREIGN PATENT DOCUMENTS

EP 0335139 * 10/1989

* cited by examiner

*Primary Examiner*—David R. Hudspeth
*Assistant Examiner*—Samuel G Neway
(74) *Attorney, Agent, or Firm*—David A. Mims; Rudolf O. Siegesmund; Gordon & Rees LLP

(57) ABSTRACT

A method for translating the string literals in a database script from a source language (i.e. English) into a target language (i.e. Chinese). The invention comprises a Conversion Program (CP) and a Field Expansion Program (FEP). The CP copies a database script in a source language and runs the FEP, which analyzes the database script and determines the maximum width of the fields. The user may then adjust the field length as necessary. The CP then substitutes labels for the string literals in the new database script, which creates a message file. The CP uses a pre-existing data file to translate the source language string literals into the target language string literals. The translated message file is called a label file. The CP then uses the label file to substitute the target language string literals for the labels in the database script.

17 Claims, 4 Drawing Sheets

| LABEL | ENGLISH STRING LITERAL |
|---|---|
| 1001 | GIVEN NAME |
| 1002 | FAMILY NAME |
| 1003 | ADDRESS |
| 1004 | TELEPHONE |

| ENGLISH | CHINESE |
|---|---|
| GIVEN NAME | 丘 |
| FAMILY NAME | 姓 |
| ADDRESS | 地址 |
| TELEPHONE | 电话 |

| LABEL | CHINESE STRING LITERAL |
|---|---|
| 1001 | 丘 |
| 1002 | 姓 |
| 1003 | 地址 |
| 1004 | 电话 |

DATABASE SCRIPT TRANSLATION TOOL

FIELD OF THE INVENTION

The present invention is related generally to methods of translating computer files from one language into another and specifically to a method for automatically translating a database script from a source language into a target language without the need for user modification of the database script.

BACKGROUND OF THE INVENTION

Databases play an important role in the modern business world. Significant amounts of time and resources are expended in creating and managing databases. Additionally, companies are continuously looking for methods to decrease the time and resources spent managing and modifying the databases. One area of database management where companies spend considerable time and resources is the area of database translation from an original or source language (i.e. English) to a new or target language (i.e. Spanish, Chinese, or any language other than the original or source language).

The prior art has presented two basic solutions to the problem of database translation which can be described as script translation and extract translation. The script translation method requires translators to access the actual database source code and translate the string literals in the database source code into the target language. Script translation is inconvenient, inefficient, and expensive. Script translation must be repeated every time the database needs to be translated into a new target language. Moreover, script translation is prone to the introduction of errors to the source code because the any typographical errors introduced by the translators (such as replacing an apostrophe (') with a quotation mark (")) effects a change in the source code and the output of the program. Such unintended and inadvertent errors are to be expected when translators, who are not code writers, are given access to source code. The cost of rectifying such errors can be significant because such errors are difficult to identify and remove.

The extract translation method involves extracting the string literals out of the database script, translating the string literals separately, and then inserting the string literals back into the database script. However, the extraction process makes it difficult to keep track of the changes made to source code during the numerous extractions and replacements. Moreover, the extraction process must be repeated every time the database needs to be translated into a new target language. Therefore, what is needed beyond the prior art is a method for translating a database script from a source language into a target language which makes it easier to track the changes to the source code and allows the database script to be translated into a plurality of different languages.

Furthermore, the cost of translating any type of documentation is expensive and time consuming. The applications associated with the database must be translated and so a data file will exist containing translated terms that will correspond to most, if not all, of the string literals in the database source code. Use of the data files to translate the string literals in the database script would eliminate the need to have a translator translate the database script. Therefore, a need exists for a method of utilizing a data file to translate the string literals in a database script.

The prior art has previously addressed the problem of translating portions of a computer program. For example, U.S. Pat. No. 6,546,365 (the '365 patent) entitled "System for National Language Support and Automated Translation Table" discloses a method for translating the documentation of a computer program using a translation table. The invention in the '365 patent utilizes the translation table to translate the display items into the user's language. However, method of the '365 patent translates only the message files in the computer program. The '365 patent also makes several modifications to the source code of the underlying computer program. What is needed beyond the prior art is a method for translating data in a database with minimal modification to the source code.

SUMMARY OF THE INVENTION

The present invention, which meets the needs identified above, is a method implementable on computer software for translating the string literals in a database script from a source language (i.e. English) into a target language (i.e. Chinese). The software embodiment of the present invention comprises a Conversion Program (CP) and a Field Expansion Program (FEP). The CP creates a copy of a database script in a source language and runs the FEP. The FEP analyzes the database script and determines the maximum width of the translated fields. The user may then adjust the field length to accommodate the increase or decrease in field width.

The CP then substitutes labels for the string literals in the new database script. The substitution process creates a message file, which is a list of all of the labels in the database script and the corresponding string literals. The CP then accesses a pre-existing data file, which is similar to a source language-target language dictionary. The CP uses the data file to translate the source language string literals into the target language string literals. The translated message file is called a label file. The CP then uses the label file to substitute the target language string literals for the labels in the database script. The database script may then be run as a program to produce a translated database. Thus, a translated database is produced without altering the original database script and with a minimal amount of human intervention in substituting segments of the code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "data file" shall mean a computer file containing a plurality of string literals in a source language and their corresponding translation into a target language, usually derived from the translation of one or more applications using the database, but that may be derived from any pre-existing source.

As used herein, the term "label" shall mean a unique identifier which is substituted in place of a string literal that has been extracted from a copy of a database script and may also placed in a label file.

As used herein, the term "label file" shall mean a computer file containing a list of labels in the database script and a corresponding list of target language words.

As used herein, the term "message file" shall mean a computer file containing a list of labels in the database script and a corresponding list of source language words.

As used herein, the term "script" shall mean the computer code for a database.

As used herein, the term "source language" shall mean the original language of the string literals in the database script.

As used herein, the term "string literal" shall mean a non-null, variable length data entry in a database.

As used herein, the term "substitute" shall mean to replace a string literal with a label or to replace a label with a string literal.

As used herein, the term "target language" shall mean the language which a user wants to translate the database string literals into.

Figure 1:
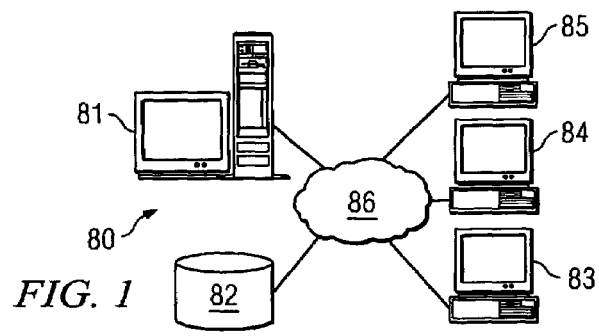
FIG. 1 is an illustration of a computer network used to implement the present invention.

FIG. 1 is an illustration of computer network 80 associated with the present invention. Computer network 80 comprises local computer 85 electrically coupled to network 86. Local computer 85 is electrically coupled to remote computer 84 and remote computer 83 via network 86. Local computer 85 is also electrically coupled to server 81 and database 82 via network 86. Network 86 may be a simplified network connection such as a local area network (LAN) or may be a larger network such as a wide area network (WAN) or the Internet. Furthermore, computer network 80 depicted in FIG. 1 is intended as a representation of a possible operating network that may contain the present invention and is not meant as an architectural limitation.

Figure 2:
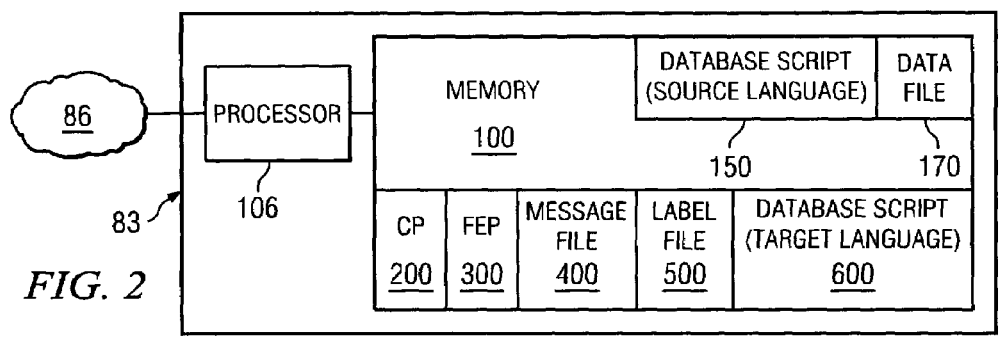
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Conversion Program (CP) 200 and Field Expansion Program (FEP) 300. CP 200 and FEP 300 described herein can be stored within the memory of any computer depicted in FIG. 1. Alternatively, CP 200 and FEP 300 can be stored in an external storage device such as a removable disk, a CD-ROM, or a USB storage device. Memory 100 is illustrative of the memory within one of the computers of FIG. 1. Memory 100 also contains database script 150 and data file 170. The present invention may interface with database script 150 and data file 170 through memory 100. CP 200 and/or FEP 300 may produce message file 400, label file 500, and database script 600. As part of the present invention, the memory 100 can be configured with CP 200 and/or FEP 300. Processor 106 can execute the instructions contained in CP 200 and/or FEP 300. Processor 106 and memory 100 are part of a computer such as remote computer 83 in FIG. 1. Processor 106 can communicate with other computers via network 86.

In alternative embodiments, CP 200 and/or FEP 300 can be stored in the memory of other computers. Storing CP 200 and/or FEP 300 in the memory of other computers allows the processor workload to be distributed across a plurality of processors instead of a single processor. Further configurations of CP 200 and/or FEP 300 across various memories are known by persons of ordinary skill in the art.

Figure 3:
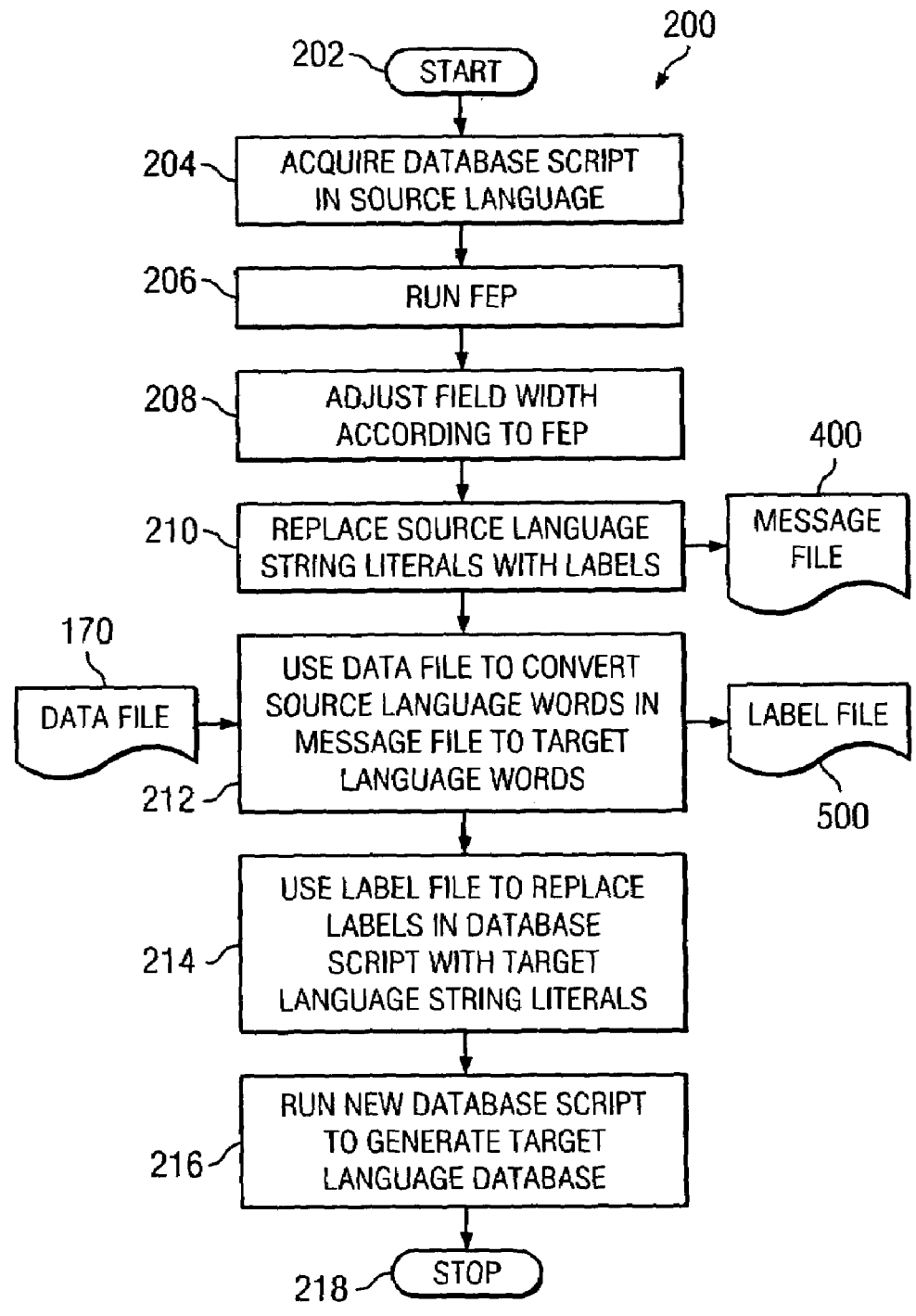
FIG. 3 is an illustration of the logic of the Conversion Program (CP) of the present invention.

Turning to FIG. 3, the logic of Conversion Program (CP) 200 is illustrated. CP 200 is a program which converts string literals in a database script from a source language into a target language. CP 200 starts (202) when prompted by the user. The user may be a person of ordinary skill in the art, such as a database administrator. One of the aspects of the present invention is that the original database script remains unaltered. Therefore, CP 200 acquires a database script in the source language and makes an identical copy (204). The database script may be identified by the user and may be like database script 150 in FIG. 2. CP 200 then runs FEP 300 (206). CP 200 then adjusts the field widths in the new database script for the specified language according to parameters obtained in FEP 300 (208). CP 200 then replaces the source language string literals in the new database script with labels (210). In replacing the source language string literals with labels, CP 200 records the identity of each label and the source language string literal that the label replaced. The list of labels and source language string literals is called the message file. The message file may be like message file 400.

CP 200 then uses the data file to convert the source language string literals in the message file to target language string literals (212). As defined above, the term "data file" means a plurality of string literals in a source language and their corresponding translation into a target language, usually derived from the translation of one or more applications, but that may be derived from any pre-existing source. The data file is a list, similar to dictionary, which contains terms that have already been translated into the target terms. The data file may be like data file 170. The string literals may be text entries, such as "first name" or may be a combination of numbers and text, such as "1234 Main Street." Furthermore, the string literals may contain a shift-in and/or a shift-out. A shift-in occurs when the data entry in a single string literal starts in a single byte character set and changes to a double byte character set, or vice-versa. A shift-out occurs when the data entry changes from the second character set (either single byte or double byte) back to the first character set. Thus, a string literal with a shift-in and/or a shift-out will contain more than one language and possibly numbers as well. Consequently, the invention may need to access a plurality of different data files in order to translate the message file. In some cases, it may be necessary for a translator to complete the translation process if the data file is inadequate. In those cases, the invention will automatically prompt the user to notify him which labels in the data file are inadequate. Specifically, if the data file does not contain terms that match all of the string literals, then it will be necessary to send those terms to a translator, have the terms translated, and manually enter the terms and the translations into the data file. If desired, the user may also choose to have certain tables within the database translated into a plurality of different languages. For example, the user may want to translate a first table into Chinese, a second table into Japanese, and a third table into Spanish. Use of the invention to translate certain tables into different languages will produce a plurality of different label files which may then be used to translate the database script.

When the conversion of source language string literals to target language string literals is completed, the new file is called the label file. Thus, the label file contains a list of all of the labels in the database script and the corresponding target language string literals. The label file may be like label file 500. CP 200 then uses the label file to replace the labels in the database script with the target language string literals (214). CP 200 then runs the new database script to generate the target language database (216). CP 200 then ends (218).

Because the new database contains the labels in place of the string literals, the message file is the only computer file that would be accessed by a translator, and such access would only take place the data file did not contain all of the terms necessary to match the string literals. Moreover, another novel aspect of the present invention is that the user may make copies of the message file and translate the copies of the message file into a plurality of different target language label files. CP 200 may then substitute each label file into a separate copy of the database script and create a plurality of different language databases with minimal modifications to the database script.

Figures 4, 5, 6, 7:
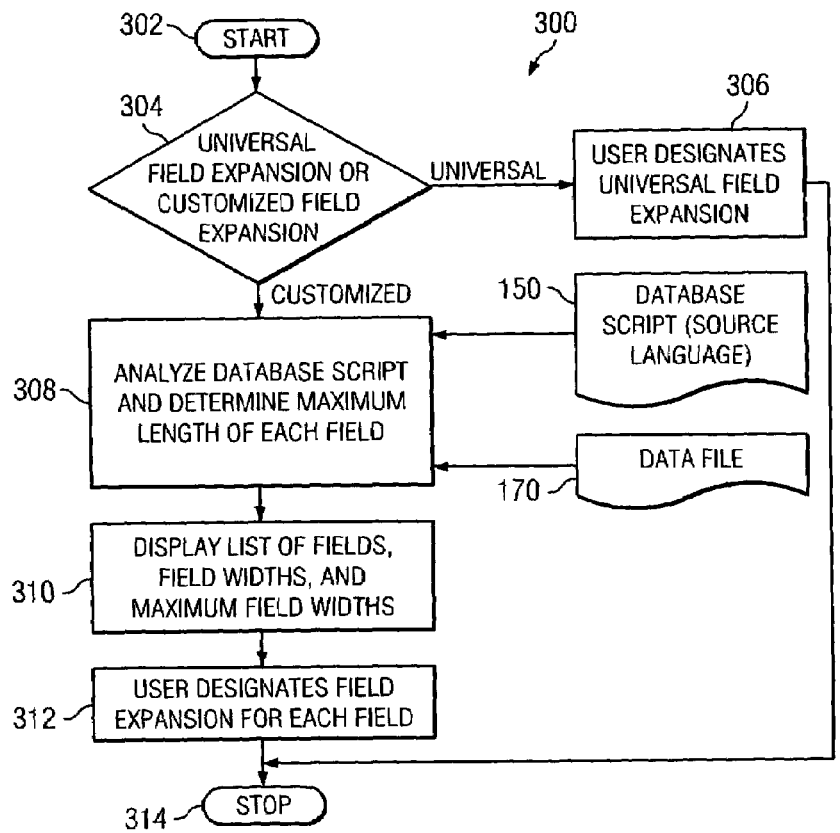
FIG. 4 is an illustration of the logic of the Field Expansion Program (FEP) of the present invention.
FIG. 5 is an illustration of the contents of the message file of the present invention.
FIG. 6 is an illustration of the contents of the data file of the present invention.
FIG. 7 is an illustration of the contents of the label file of the present invention.

Turning to FIG. 4, the logic of Field Expansion Program (FEP) 300 is illustrated. FEP is a program that expands or contracts the field widths within the database based on the field width requirements when the string literals have been converted from the source language to the target language. FEP 300 starts (302) when directed by CP 200. FEP 300 then queries the user whether the user wants to universally expand all of the field widths by the same percentage, or whether the user wants to customize the expansion of each individual field (304). If the user chooses to universally expand all of the field widths by the same percentage, then the user specifies what percentage he wants the field widths to be expanded (306) and FEP 300 ends (314). In specifying the field width expansion percentage, the user is initially offered a percentage of one hundred percent. Decreasing the percentage below one hundred percent will decrease the field size. Increasing the percentage above one hundred percent will increase the field size. Alternatively, the user can specify the field width by entering a specific number for the field width. Further in the alternative, the present invention can be configured to customize the field width based on the data type or any other parameter selected by a person of ordinary skill in the art. For example, the user could specify that CHAR fields are expanded by twenty percent and VARCHAR fields are expanded by fifty percent. The invention may also be configured such that the data type itself is altered. For example, all CHAR fields are converted to VARCHAR fields. Similar modifications to the data fields, field width, data types, and other data and field parameters will be appreciated by a person of ordinary skill in the art.

If at step 304 the user chooses to customize the field width expansion, then FEP 300 analyzes the database script and determines the maximum length of each field (308). In determining the maximum length of each field, FEP 300 uses data file 170 and the database script 150 to determine what the maximum length of any string literal will be for a given field. FEP 300 then displays a list containing the fields, the field widths, and the maximum field widths (310). The user may then choose to increase or decrease the size of each specific field (312). The user may increase the width of each field by increasing the percentage above one hundred percent, or may decrease the field width by decreasing the field width below one hundred percent. Alternatively, the user can specify the field width by entering a specific number for each field width. FEP 300 then ends (314).

Turning to FIGS. 5-7, examples of message file 400, application file 170, and label file 500 are illustrated. In FIGS. 5-7, the source language is English and the target language is Chinese. As can been seen in FIG. 5, message file 400 contains a list of the labels in the database script and the corresponding English string literals. As can been seen in FIG. 6, data file 170 contains a list of the English words and their Chinese translations. As can been seen in FIG. 7, label file 500 contains a list of the labels in the database script and the corresponding Chinese string literals.

Figure 8:
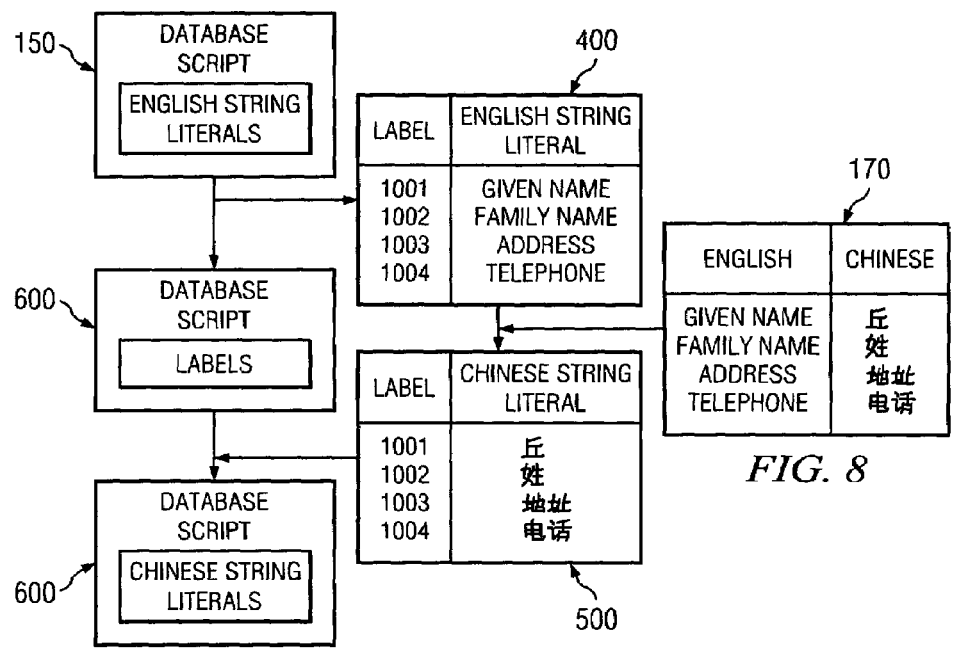
FIG. 8 is an illustration of the interaction between the database scripts, message file, data file, and label file associated with the present invention.

Turning to FIG. 8, the interrelation between the message file, the data file, and the label in FIGS. 5-7 and the database scripts is illustrated. As described in conjunction with FIGS. 3 and 4, database script 150 contains English string literals. CP 200 creates database script 600 containing labels from database script 150 containing English string literals. The substitution of labels for string literals is recorded in message file 400. CP 200 then uses data file 170 to convert message file 400 into label file 500. CP 200 then uses label file 500 to substitute the Chinese string literals for the labels in database script 600.

Figure 10:
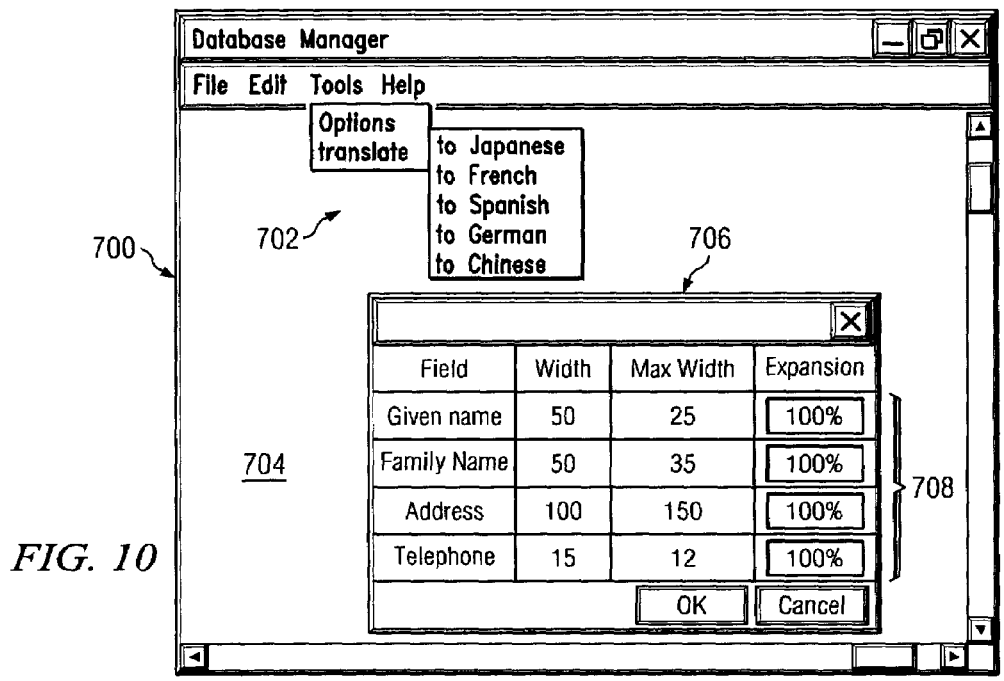
FIG. 10 is an illustration of the GUI associate with the FEP of the present invention.
Figure 9:
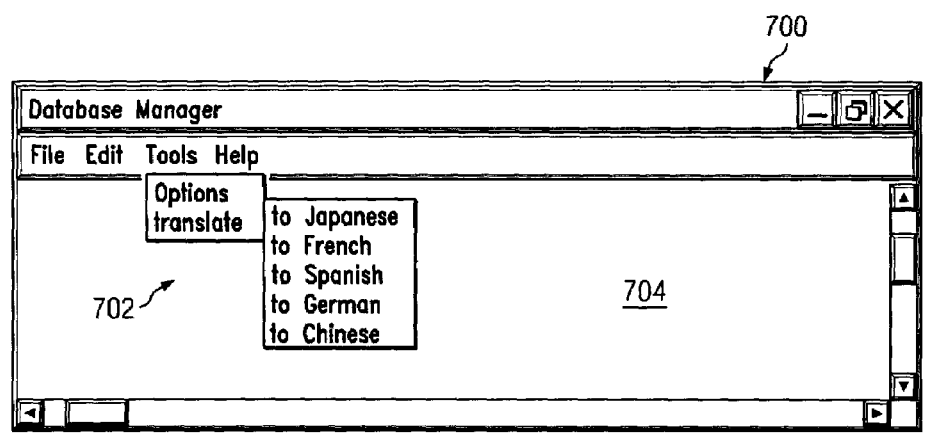
FIG. 9 is an illustration of the graphical user interface (GUI) associated with the CP of the present invention.

Turning to FIGS. 9-10, the graphical user interfaces (GUIs) used to implement the present invention is illustrated. The present invention is intended to be a plug-in program for a database management program such as IBM DB2, MICROSOFT SQLSERVER, or ORACLE. Alternatively, the present invention could be a stand-alone computer program. As seen in FIG. 9, GUI 700 contains database management program 704 and includes menu 702. The user may pull down menu 702 and choose to translate the database from the source language into one of a plurality of target languages. As seen in FIG. 10, when the user chooses to translate a database using menu 702, field width menu 706 appears the user may change the width of any of the fields by changing the field width percentage 708. Alternatively, the user can specify a universal field width expansion for all of the fields (not illustrated).

With respect to the above description, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method comprising:

acquiring an original database script in a source language;

copying the original database script to create a copied database script;

substituting a source language string literal in the copied database script with a label;

creating a message file comprising a correspondence between the source language string literal and the label;

using a translation data file to translate the source language string literal in the message file into a target language string literal;

creating a label file comprising a correspondence between the target language string literal and the label;

substituting the label in the copied database script with the target language string literal in the label; and adjusting the field width in the copied database script;

wherein the adjusting the field width step comprises:

analyzing a database script to determine the maximum width of each field;

displaying a list of fields, field widths, and maximum field widths; and allowing a user to modify a field width;

whereby a translated database is produced.

2. The method of claim 1 wherein the adjusting the field width step occurs without user intervention.

3. The method of claim 1 further comprising: running the copied database script to create a target language database.

4. The method of claim 1 wherein the source language is English.

5. A program product operable on a computer, the program product comprising:

a computer-usable medium;

wherein the computer usable medium comprises instructions comprising:

instructions for acquiring an original database script in a source language;

instructions for copying the original database script to create a copied database script;

instructions for substituting a source language string literal in the copied database script with a label;

instructions for creating a message file comprising a correspondence between the source language string literal and the label;

instructions for using a translation data file to translate the source language string literal in the message file into a target language string literal;

instructions for creating a label file comprising a correspondence between the target language string literal and the label;

instructions for substituting the label in the copied database script with the target language string literal in the label file; and instructions for adjusting the field width in the copied database script;

wherein the adjusting the field width step comprises:

instructions for analyzing a database script to determine the maximum width of each field;

instructions for displaying a list of fields, field widths, and maximum field widths; and instructions for allowing a user to modify a field width;

wherein a translated database script is produced.

6. The program product of claim 5 wherein the adjusting occurs without user intervention.

7. The program product of claim 5 further comprising: instructions for running the copied database script to create a target language database.

8. The program product of claim 5 wherein the source language is English.

9. A program product for causing a computer to translate a source language database script into a target language database script, the program product comprising:

a computer-usable medium;

wherein the computer usable medium comprises instructions encoded thereon comprising:

a conversion program capable of converting a database script from a source language into a target language having a first set of instructions comprising:

instructions for acquiring an original database script in a source language;

instructions for copying the original database script to create a copied database script;

instructions for substituting a source language string literal in the copied database script with a label;

instructions for creating a message file comprising a correspondence between the source language string literal and the label;

instructions for using a data file to translate the source language string literal in the message file into a target language string literal;

instructions for creating a label file comprising a correspondence between the target language string literal and the label;

instructions for substituting the label in the copied database script with the target language string literal in the label file;

instructions for adjusting the field width in the copied database script; and a field expansion program capable of expanding the width of a field in the database script having a second set of instructions comprising:

instructions for analyzing a database script to determine the maximum width of each field;

instructions for displaying a list of fields, field widths, and maximum field widths; and instructions for allowing a user to modify a field width;

whereby the source language database script is translated into a target language database script.

10. The program product of claim 9 wherein the adjusting occurs without user intervention.

11. The program product of claim 9 wherein the conversion program further comprises: instructions for running the copied database script to create a target language database.

12. The program product of claim 9 wherein the source language is English.

13. A computer readable medium encoded with a plurality of instructions, the plurality of instructions comprising:

instructions for displaying a graphical user interface having a window, a menu displayed on the window, and an option displayed on the menu;

wherein user selection of the option causes a computer program to execute, the computer program comprising:

a conversion program capable of converting a database script, from a source language into a target language having a first set of instructions comprising:

instructions for acquiring an original database script in a source language;

instructions for copying the original database script to create a copied database script;

instructions for substituting a source language string literal in the copied database script with a label;

instructions for creating a message file comprising a correspondence between the source language string literal and the label;

instructions for using a data file to translate the source language string literal in the message file into a target language string literal;

instructions for creating a label file comprising a correspondence between the target language string literal and the label;

instructions for substituting the label in the copied database script with the target language string literal in the label file;

instructions for adjusting the field width in the copied database script; and a field expansion program capable of expanding the width of a field in the copied database script having a second set of instructions comprising:

instructions for analyzing a copied database script to determine the maximum width of each field;

instructions for displaying a list of fields, field widths, and maximum field widths; and instructions for allowing a user to modify a field width;

whereby the source language database script is translated into a target language database script.

14. The computer readable medium of claim 13 further comprising:

instructions for adjusting the field width in the copied database script.

15. The computer readable medium of claim 14 wherein the adjusting occurs without user intervention.

16. The computer readable medium of claim 13 further comprising:

instructions for running the copied database script to create a target language database.

17. The computer readable medium of claim 13 wherein the source language is English.

* * * * *